United States Patent [19]

Parrott et al.

[11] Patent Number: 5,341,313
[45] Date of Patent: Aug. 23, 1994

[54] CATALYST LIFE PREDICTION IN HYDRODESULFURIZATION

[75] Inventors: Stephen L. Parrott, Okla.; Raul Adarme; Fan-Nan Lin; Edwin P. Sasscer, all of Bartlesville, Okla.

[73] Assignee: Phillips Petroleum Company, Bartlesville, Okla.

[21] Appl. No.: 924,138

[22] Filed: Aug. 3, 1992

[51] Int. Cl.⁵ ............................................. G06G 7/58
[52] U.S. Cl. ................................... 364/578; 364/150; 364/151; 364/501
[58] Field of Search ............... 364/578, 501, 502, 150, 364/151

[56] References Cited

U.S. PATENT DOCUMENTS

| | | | |
|---|---|---|---|
| 3,828,171 | 8/1974 | Griffin | 364/151 X |
| 4,619,759 | 10/1986 | Myers et al. | 208/210 |
| 4,975,827 | 12/1990 | Yonezawa | 364/151 |
| 5,070,458 | 12/1991 | Gilmore et al. | 364/151 X |
| 5,091,843 | 2/1992 | Peczkowski | 364/150 |
| 5,132,918 | 7/1992 | Funk | 364/501 |

OTHER PUBLICATIONS

Liptak, B. G., "Instrument Engineers Handbook", Process Control, pp. 1001–1002, Chilton Book Co., 1985.

Frye, C. G. et al., "Kinetics of Hydrodesulfurization", Chemical Engineering Process, vol. 63, No. 9, Sep. '67.

Bartholomew, C. H., "Catalyst Deactivation", Chemical Engineering, Nov. 12, 1984.

Primary Examiner—Jack B. Harvey
Assistant Examiner—Eric W. Stamber
Attorney, Agent, or Firm—George E. Bogatie

[57] ABSTRACT

Catalyst life in desulfurization of distillate hydrocarbon streams is predicted with the aid of a computer simulation which embodies an analytical kinetic model of a hydrodesulfurization reaction and a semi-empirical model for catalyst deactivation. The simulation specifies the decline of catalyst activity with time and a current reaction temperature required to maintain the initial catalyst activity. The useful life of the catalyst is considered to be the time required for catalyst activity in the simulated reaction to decline sufficiently from its initial level so that a predefined maximum reaction temperature is reached while maintaining a desired level of sulfur in the desulfurized product. The computer time needed to simulate the reaction is decreased by combining superior features of LOTUS 1-2-3 and FORTRAN language, such that input/output and graphic operations are implemented with LOTUS 1-2-3 and numerical calculations are executed in FORTRAN.

12 Claims, 12 Drawing Sheets

FIG. 4A — REACTOR MODEL

FIG. 4B — DEACTIVATION MODEL

```
05-29-91                DISTILLATE DESULFURIZATION REACTOR MODEL                P252R

MAIN SCREEN

RATING/PREDICTION CASE:                         PREDICTION

RATING CASE DATA:

START OF RATING DATE                        05/02/90
            END OF RATING DATE                          11/28/91
            INLET TEMPERATURE AT END OF RATING (°C)        330.6
            RATING TIME SPAN (MONTHS)                       19.2
            CATALYST ACTIVITY (PERCENT OF FRESH)            57.0

PREDICTIONS:

ADDITIONAL CATALYST LIFE (MONTHS)               20.0
            CATALYST ACTIVITY (PERCENT OF FRESH)            19.3
            END OF RUN INLET TEMPERATURE (°C)              376.6

TOTAL CATALYST LIFE (MONTHS)                    40.0
```

CATALYST LIFE PREDICTION IN HYDRODESULFURIZATION

This invention relates to desulfurization of hydrocarbon distillates from a crude oil distillation unit and light cycle oils from fluid catalytic cracking. In one aspect, it relates to a method of predicting useful catalyst life for different operating conditions and feeds in a hydrodesulfurization process. In another aspect, it relates to using a new computer program for simulating reaction kinetics and catalyst deactivation in predicting catalyst life for a hydrodesulfurization process.

BACKGROUND OF THE INVENTION

The removal of sulfur from distillate fractions by a catalytic reaction with hydrogen to form hydrogen sulfide is widely applied in petroleum refining. In commercial processes, active catalysts are typically employed in fixed bed reactors with continuous mass transfer through the reactor for removal of sulfur from distillate fractions and light cycle oil fractions, with the desulfurized product used for blending highway diesel fuels having a limited sulfur content. For example, it is known to desulfurize distillates and light cycle oils containing from about 0.2 to about 1.2 weight percent sulfur to a level of about 0.05 weight percent sulfur in the presence of catalyst which comprise alumina, cobalt and molybdenum.

It is also known in the art that the activity of such catalysts, used in desulfurization, will decline to an ineffective level after a period of time which is highly dependent on process conditions and on the sulfur species present in the oil being treated. The decline in activity is believed to be due to the formation of carbon on the catalyst, such that a higher reaction temperature is required to maintain a desired degree of desulfurization as the catalyst activity declines. Since desulfurization catalyst life is dependent essentially on process conditions and to a large extent on the boiling point distribution of sulfur species present in the oil, both of which can change during a typical commercial run, a reliable prediction of catalyst life has been extremely difficult. Accordingly, it has been necessary to periodically regenerate or replace catalyst to insure acceptable catalyst activity, and suspend production during the regeneration or replacement operation, even though useful levels of activity remained on the catalyst being replaced or regenerated.

Accordingly, it is a primary object of this invention to accurately predict life of a catalyst in a distillate or LCO hydrodesulfurization operation with the prediction based on a computer simulation.

It is a more specific object of this invention to predict the temperature-time profile of a catalyst HDS reaction for various process and feed conditions.

It is another object of this invention to provide substantial savings in a petroleum refining process operation by providing guidance for refiners in avoiding premature regeneration or replacement of catalyst in a distillate HDS process.

Another objective of this invention is to provide guidance for refiners in evaluating future feedstocks for economical HDS processing.

Still another object of this invention is to predict process conditions for deep desulfurization operations of existing units.

A further object of this invention is to provide data for designing, sizing and costing new units for deep desulfurization.

BRIEF SUMMARY OF THE INVENTION

In accordance with this invention, a computer based chemical kinetic model for a distillate HDS reaction, and a deactivation model for the catalyst are used together to simulate the HDS reaction by predicting a temperature-time profile of the HDS reaction, and to further predict the distribution of sulfur compounds in the desulfurized product. The catalyst deactivation model specifies the decline of activity with time and the current reaction temperature required to maintain the initial catalyst activity. The useful life of the catalyst is considered to be the time required for the catalyst activity in the simulated HDS reaction to decline sufficiently from its initial value that a predefined maximum reaction temperature is reached while maintaining the desired level of sulfur in the desulfurized product.

In a preferred embodiment, a rating case simulation forces agreement a simulated temperature-time profile and actual current temperature-time profile for an HDS reaction. This rating case simulation can be employed in conjunction with a prediction case simulation which anticipates the remaining catalyst life for assumed future process conditions, catalyst characteristics and sulfur distribution in the feed oil to be treated in the simulation.

Other objects and advantages of the invention will be apparent from the foregoing brief description of the invention and the claims, as well as a detailed description of the drawings, which are briefly described as follows:

DETAILED DESCRIPTION OF THE INVENTION

Hydrodesulfurization reactions are typically carried out in a fixed bed reactor. The oil feed is mixed with hydrogen-rich gas either before or after it is preheated to the proper reactor inlet temperature. Most hydrotreating reactions are carried out below 427° C. to minimize cracking and the feed is usually heated to between 260° and 427° C. The oil feed combined with the hydrogen-rich gas enter the top of the fixed bed reactor. In the presence of the catalyst, the hydrogen reacts with the oil to produce hydrogen sulfide, along with desulfurized products and other hydrogenated products. The reactor effluent is cooled before entering a separator which removes the hydrogen-rich gas from the desulfurized oil. The desulfurized oil is stripped of any remaining hydrogen sulfide and light ends in a stripper. The hydrogen gas may be treated to remove hydrogen sulfide and recycled to the reactor.

Figure 1:
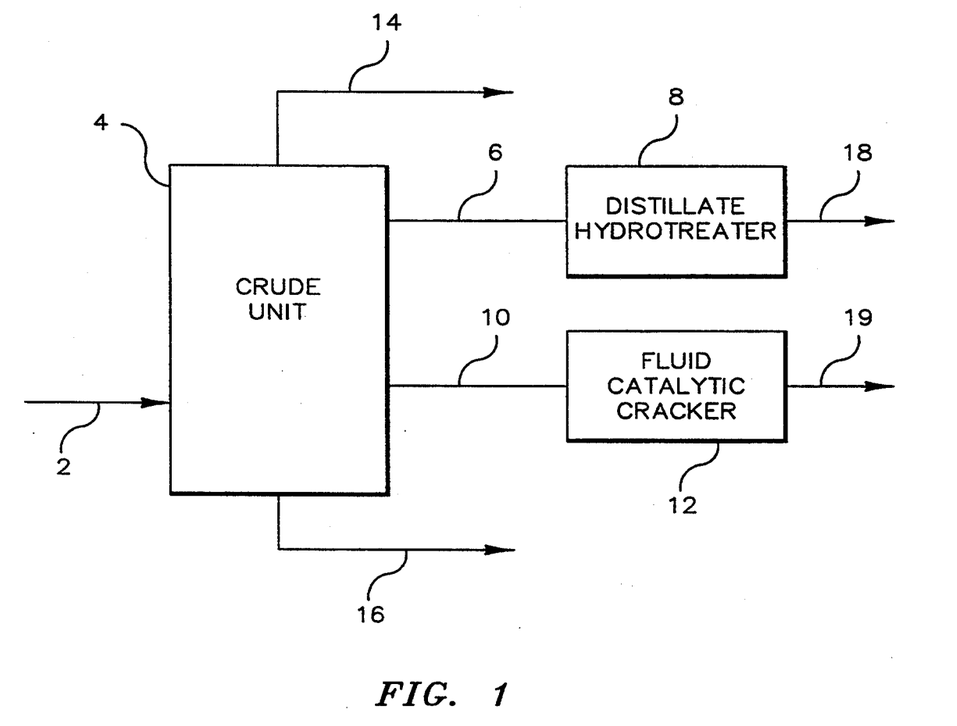
FIG. 1 is a simplified refinery flow diagram illustrating a distillate fraction for desulfurization.

The hydrodesulfurization feedstock contemplated in the present invention is a distillate fraction boiling in a range of about 138°–393° C. which, for example, may be obtained in a refinery facility such as shown diagramatically in FIG. 1. Referring now to FIG. 1, a crude petroleum charge is supplied via conduit 2 to a crude unit 4. As is well known in the art, crude units may be operated to produce a variety of cuts including kerosene, light and heavy gas oils, etc. In the simplified embodiment shown in FIG. 1, the distillate fractions from the crude unit include a kerosene/diesel stream, hereinafter referred to as distillate. At conduit 6, the distillate stream is passed to the hydrotreater 8 for which catalyst life predictions are provided according to the present invention. Desulfurized product is withdrawn via conduit 18. Other illustrated fractions from the crude unit include a single light cycle oil stream which is withdrawn in conduit 19 from a fluid catalytic cracking unit 12, and for which catalyst life predictions for light cycle oil desulfurization may also be provided according to this invention. Naptha and lighter may be taken overhead via conduit 14 and topped crude or so called resid may be taken via conduit 16 for further processing.

DEVELOPMENT OF KINETIC MODEL

It is generally known that any suitable organic sulfur compound contained in a hydrocarbon feedstock can be hydrodesulfurized. Suitable organic sulfur compounds include sulfides, disulfides, mercaptans, thiophenes, benzothiophenes, dibenzothiophenes and mixtures thereof.

In accordance with one aspect of this invention, there is provided a mathematical model describing chemical kinetics for hydrodesulfurization of a hydrocarbon stream. The kinetic model illustrated, which assumes presence of 26 reactively different sulfur species in the hydrocarbon feed, is based on mass and energy balances for removal of individual sulfur compounds from a liquid hydrocarbon feed in a fixed bed reactor and includes effects of catalyst aging, temperature, hydrogen pressure, hydrogen sulfide inhibition and feed rate.

Figure 2:
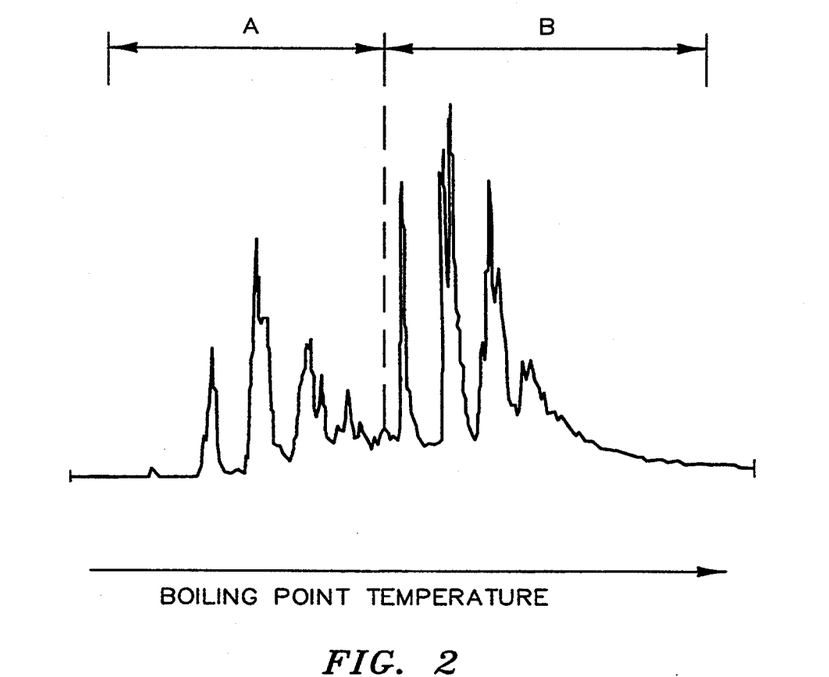
FIG. 2 illustrates a typical sulfur boiling point distribution used to develop sulfur removal kinetics.

A chromatographic analysis showing boiling point distribution of sulfur compounds contained in a typical hydrocarbon feed is illustrated in FIG. 2. The sulfur compounds illustrated in FIG. 2 include benzothiophenes in section A and dibenzothiophenes in section B.

Figure 3:
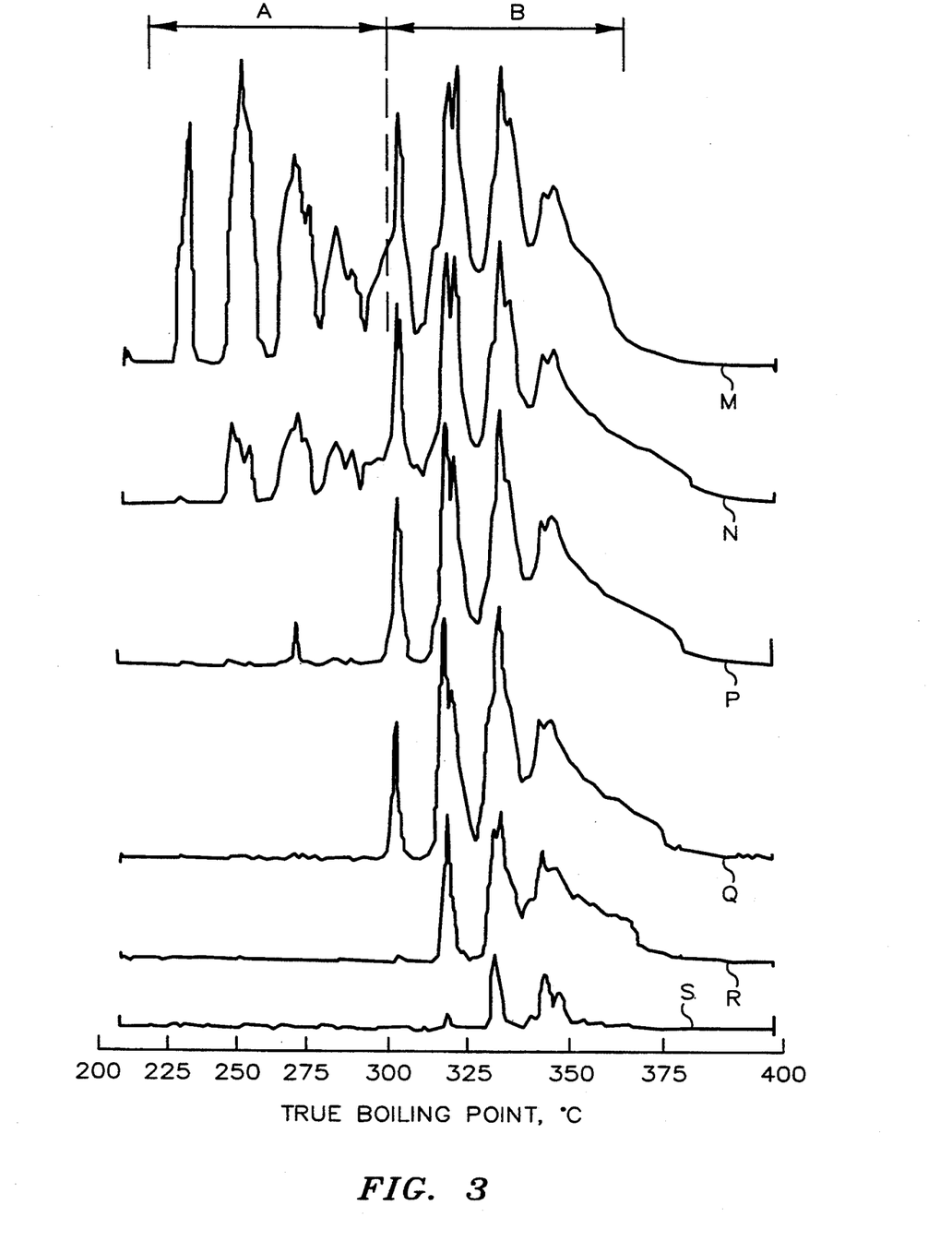
FIG. 3 illustrates relative reactivities of different sulfur species.

The series of gas chromatograph traces in FIG. 3 illustrates the relative reactivities of the benzothiophene and dibenzothiophene sulfur species illustrated in FIG. 2, and the resistance of different sulfur compounds to desulfurization can be seen in the variation of individual compound reaction rates. In FIG. 3, the hydrocarbon feed of curve M contains 0.8 wt % total sulfur, curve N, 0.5% total sulfur, curve P, 0.4% total sulfur, curve Q, 0.3% total sulfur, curve R, 0.13% total sulfur and curve S, 0.05% total sulfur. The sulfur compounds with low boiling point temperatures disappear appreciably faster than the compounds with higher boiling temperatures, such that after desulfurization to less than 0.3 wt % total sulfur, only dibenzothiophene and its alkyl derivates remain in the product. Based on these results, a kinetic rate constant for each identified compound, which can be analyzed over the duration of an experiment, can be obtained. As previously indicated, the HDS reaction takes place in a fixed bed reactor, width reactant charged to the top of the reactor such that the charge of gaseous hydrogen and the liquid distillate flow downwardly through the catalyst. The chemical reaction occurs in the gas or liquid phase and forms a liquid product.

Figures 4A, 4B:
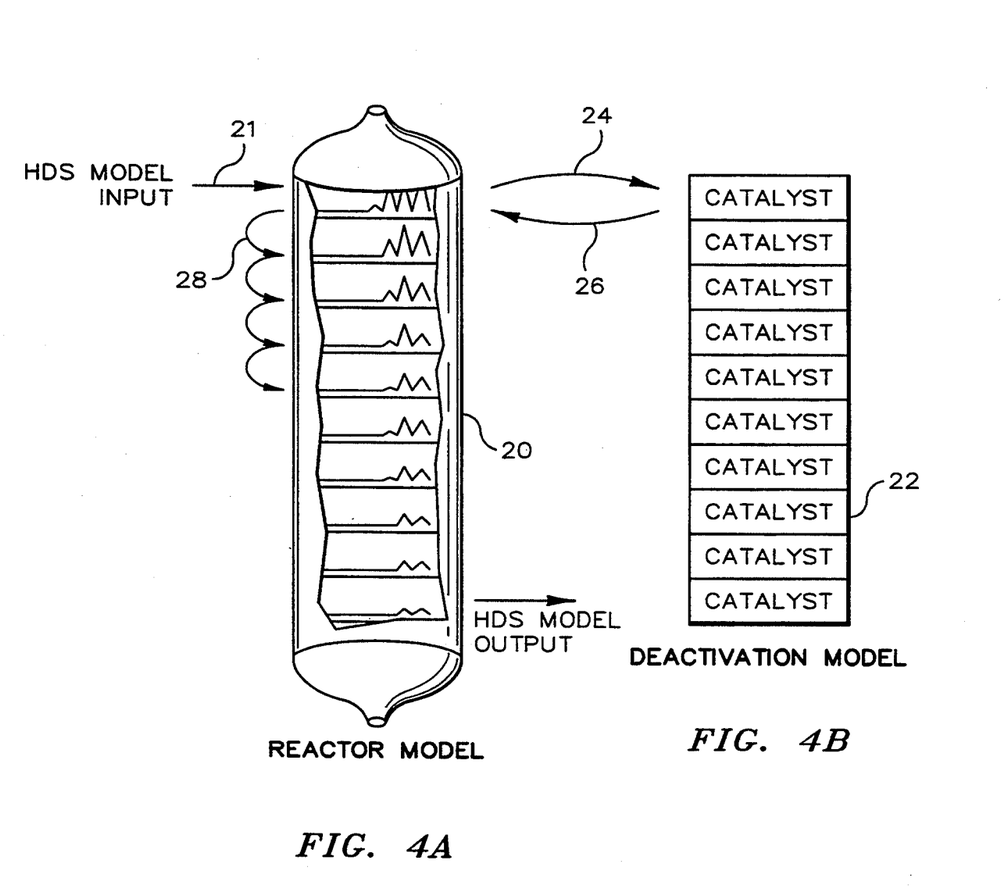
FIG. 4A illustrates a fixed catalyst bed reactor model divided into ten zones.
FIG. 4B illustrates a catalyst deactivation model divided into ten zones corresponding to the ten zones of the reactor model of FIG. 4A.

For accuracy in modeling, the reactor is considered as being divided into ten homogenous zones, as illustrated in FIG. 4A. Referring now to FIGS. 4A and 4B, the reactor model 20 and the catalyst deactivation model 22 are each divided into ten corresponding zones. The required model inputs are received via line 21 and deactivation model inputs are passed via line 24 from the reactor model. The deactivation model returns a value for catalyst activity via line 26. Sulfur conversion is then calculated for the first homogenous reactor lump based on a known distribution of sulfur components in the feed. The sulfur distribution for the product calculated in the first zone is passed to the second zone via line 28 and is used as the sulfur distribution for the feed to the second zone. Similarly, the reaction product composition of each upper zone is supplied as the feed to the next lower zone. At each zone, the current temperature and distribution of sulfur compounds of the treated fluid is recalculated according to a set of equations based on component continuity and energy balances, which are of the form:

$$Cs_{ip} = Cs_{if} \exp(-K_i \cdot a_c / Fr) \quad (1)$$

$$K_i = k_{oi} \exp(E_i/RT) = K_{oi} \exp(-E_i/RT) \quad (2)$$

where: i=index for sulfur compounds, 1 to 26 for this illustration.

$Cs_{if}$ is the concentration of the sulfur component in the reactor feed, moles/L.

$Cs_{ip}$ is the concentration of the sulfur components in the desulfurized product, moles/L.

$a_c$ is the active catalyst volume.

$K_i$ is the reaction rate constant of the sulfur component.

Fr is feed rate of oil pumped to the reactor, in cm$^3$/hour.

Fr/$a_c$ is the effective LHSV, hr$^{-1}$ $k_{oi}$ is called the frequency factor and is unique to each sulfur compound being removed, hr$^{-1}$.

$E_i$ is the activation energy unique to each sulfur compound being removed in the reaction.

R is the ideal gas law constant and

T is the absolute temperature of the reaction mixture.

The constants $E_i$ and $k_{oi}$ must be determined experimentally by conducting experiments at different temperatures as will be more fully explained hereinafter. The feed rate liquid hourly space velocity (LHSV) and the sulfur components must be specified.

Active Catalyst volume $a_c$ is preferably determined in accordance with a separate model as will be described more fully hereinafter. Physical properties for the sulfur components of interest are generally available in the open literature.

DEVELOPMENT OF CATALYST DEACTIVATION MODEL

The catalyst deactivation model is a semi-empirical model partially based on observed process conditions. Seven test runs were completed using distillates having properties as shown in Table I over a cobalt and molybdenum loaded KF-742 catalyst. The catalyst was sulfided according to standard Catalyst Laboratory (CL) procedure so as to pass several times the amount of $H_2S$ required to completely sulfide the catalyst at 204° C. The catalyst was then conditioned by advancing the temperature to 371° C. and continuously maintaining 371° C. for about 48 hours, while passing additional $H_2S$ over the catalyst. Using ¾ inch (1.9 cm) catalyst laboratory testing units, an activity baseline was established for seven distillate samples at the following process conditions: temperature 316° C., 2 LHSV, 4482 kPa and 56.6 m³/160 L $H_2$. The data for six test samples are summarized in Table II. Table II also shows the standard deviation of catalyst testing in the ¾ inch (1.9 cm) CL testing units. The reproducibility of these test runs was enhanced by plugging the top, bottom and interior furnace zones to reduce thermal gradients caused by air drafts, mixing 1/20 inch (0.13 cm) with 20/40 mesh alundum diluent in five equal lots and packing each lot separately in the reactor without a physical separator, such as a screen, so as to reduce catalyst/diluent segregation and improve wetting efficiency.

TABLE I

Properties of a Feedstock used in Life Tests

| | |
|---|---|
| Sulfur, wt. % | 0.56 |
| API gravity | 13.4 |
| Hydrogen, Wt. % | 8.95 |
| Nitrogen, ppm | 955 |
| Aromatics, vol % | 97 |
| Naphthalenes, vol % | 52 |
| Simulated distillation; % off (converted to D86)°C. | |
| IBP | 223 |
| 10 | 253 |
| 20 | 258 |
| 30 | 262 |
| 50 | 272 |
| 70 | 288 |
| 80 | 297 |
| 90 | 310 |
| FBP | 336 |

TABLE II (Amended)
Baseline Activity Results

| Test Sample | Average Product % S | Standard Deviation | Activity Relative to Average, °C. |
|---|---|---|---|
| 1 | .130 | 0.0036 | −1.1 |
| 2 | .129 | 0.0012 | −0.7 |
| 3 | .129 | 0.0022 | −0.8 |
| 4 | .135 | 0.0040 | −3.1 |
| 5 | .123 | 0.0068 | +1.9 |
| 6 | .123 | 0.0028 | +1.7 |

After the baseline activity was established (Table II), the six test samples were subjected to various aging conditions for a length of time which appeared to bring about sufficient deactivation as outlined below.

| | Aging Conditions | | | |
|---|---|---|---|---|
| Test Sample | Temp °C. | Press. kPa | LHSV hr$^{-1}$ | Hours |
| 1 | 371 | 4482 | 3 | 935 |
| 2 | 371 | 6895 | 1 | 1831 |
| 3 | 415 | 4482 | 1 | 612 |
| 4 | 371 | 2758 | 1 | 1469 |
| 5 | 398 | 4482 | 3 | 879 |
| 6 | 371 | 4482 | 1 | 1804 |

These conditions were maintained throughout the aging period so that the sulfur content of the product was increased as the catalyst deactivated with age. These tests are designed to separate the deactivation kinetics from the sulfur reaction kinetics, so that the results may be applied to other distillate streams regardless of their sulfur reaction kinetics. After the aging time, the catalyst were each returned to the initial baseline conditions. Because of catalyst deactivation with age, the product sulfur was higher than originally observed.

Assuming that second order kinetics best fit the observed loss of catalyst activity, the temperature and pressure dependence of the catalyst activity was fit to an equation of the form:

$$\ln(k_c) = A + B(1000/T) + C(P) \qquad (3)$$

where
  $k_c$ is the reaction rate constant for catalyst deactivation, $$\frac{1}{cm^3 hr},$$

T is reactor temperature, °K. and
  P is reactor hydrogen pressure, psig

The constants A, B and C can be experimentally determined based on a light cycle oil having properties as shown in Table I or on another distillate fraction having other properties. Generally, the constants A, B and C for distillate fractions will include a range of values as follows:
  A range 25 to 34
  B range −21 to −29
  C range −0.0005 to −0.0045

For the computer simulation, the catalyst activity is specified in terms of relative volumes of catalyst. For example, 50 cm³ is considered twice as active as 25 cm³. Using the rate constant $k_c$ defined in equation (3), an "active catalyst volume" is given in the following equation:

$$a_3 = 1/(k_c * \text{time} + 1/\text{original catalyst volume}) \qquad (4)$$

where the time and original catalyst volume are specified.

SULFUR REACTION RATE CONSTANTS DETERMINATION

The equations (1) and (2) that express the product sulfur distribution in terms of rate of reaction, catalyst activity and the sulfur distribution of the feed are called the kinetic model of the reaction. The pre-exponential factor $k_{oi}$ in equation (2) has the same units as a first order rate constant ($hr^{-1}$) and is herein called a frequency factor. It is a function of absolute temperature expressed by the Arrhenius equation, where the activation energy and the frequency factor required in the Arrhenius equation must initially be determined experimentally.

EXAMPLES

This example describes determination of rate parameters for a sulfur compound and is relevant to the kinetics of hydrodesulfurization of a distillate stream.

A sample of light cycle oil having a sulfur distribution essentially the same as that shown in the chromatogram of FIG. 2 was hydrotreated at temperatures of 260°, 288° and 316° C. and at liquid hourly space velocities of 1, 2 and 4 $cm^3$ of feed per $cm^3$ of catalyst per hour using a ¾ inch (1.9 cm) diameter catalyst laboratory test unit. The sulfur distribution of the feed and product was obtained using a series of gas chromatograms such as shown in FIG. 3. These chromatograms were analyzed by integrating the areas under the different peaks. It is noted, however, that not every peak in the chromatogram corresponds to one sulfur component only. In most cases, one peak is composed of several sulfur compounds which could have different individual reactivities.

In this example, the first peak occurring in the "B" group of peaks illustrated in FIG. 2 corresponds to dibenzothiophene. For determination of a rate constant as a function of temperature the natural log (ln) of the peak area for dibenzothiophene in the feed, divided by the peak area in the hydrotreated product is plotted versus 1/liquid hourly space velocity for experimental temperatures of 260°, 288° and 316° C. The slope of the line through the origin and the data points corresponding to a reaction temperature is taken to be the rate constant ($K_i$) for that temperature.

Figure 5:
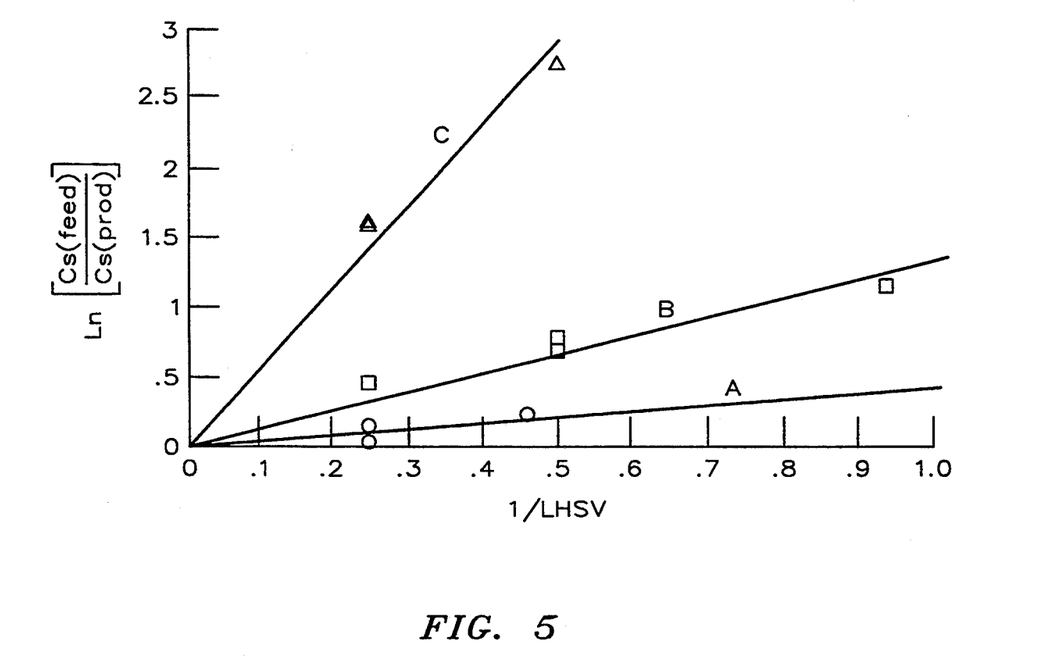
FIG. 5 is a graph showing reaction rate of dibenzothiophene.

For the plots illustrated in FIG. 5, Curve A was obtained at a temperature of 260° C., curve B at 288° C. and curve C at 316° C. and the resulting rate constants are given in Table III below:

TABLE III

| First Order Rate Constants for Removal of Dibenzothiophene | |
|---|---|
| Temp. (°C.) | Rate ($hr^{-1}$) |
| 260 | .45 |
| 288 | 1.4 |
| 316 | 5.8 |

Figure 6:
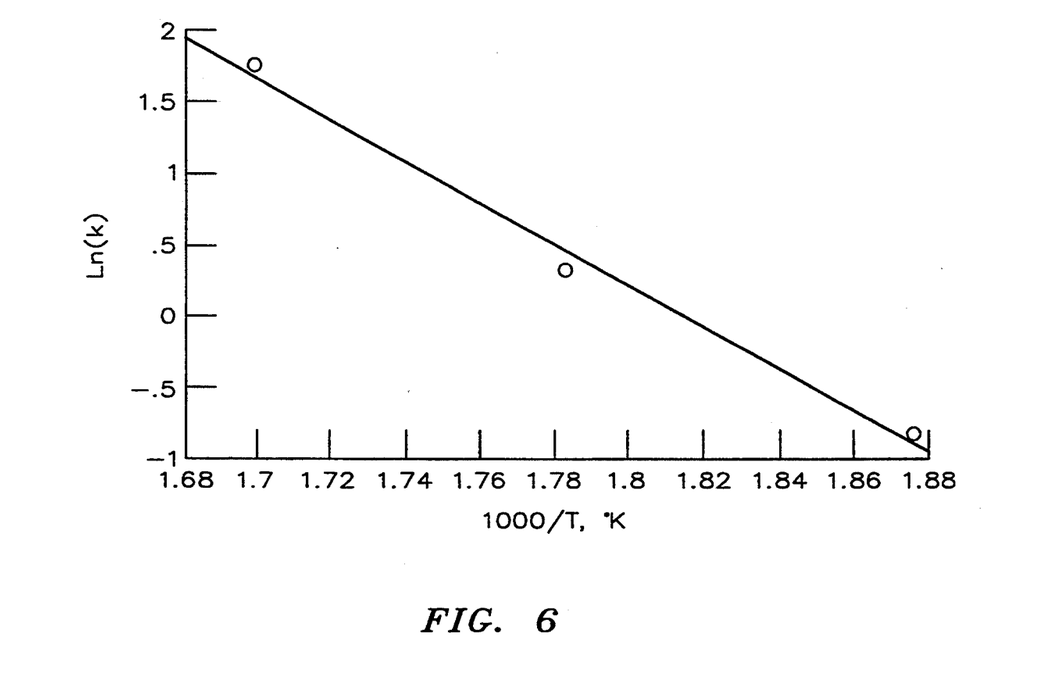
FIG. 6 is a graph showing activation energy for dibenzothiophene.

Next an Arrhenius plot for determining the activation energy of dibenzothiophene was drawn as shown in FIG. 6. The slope of the line formed by plotting the natural log of each rate constant versus the inverse of the absolute temperature is the activation energy for the removal of dibenzothiophene. The intercept of this plot is the natural log of the frequency factor ($k_{oi}$). For the slope of the straight line illustrated in FIG. 6, the activation energy is 28.6 KCal/mole, and the intercept, in ln ($k_{oi}$), is 25.96.

COMPUTER SIMULATION

For simulating a chemical reaction on a suitable digital computer, it is only necessary to program the computer with a routine that describes what is happening in the reactor and to provide the computer with necessary data. A number of digital computer programs have been developed which facilitate data handling and graphic display capacity. One such program, which is well known, is called LOTUS 1-2-3. This program runs on many different computer systems and it is preferably used in this invention for input/output operations and as a graphic interface, with FORTRAN language used for numerical calculations. LOTUS 1-2-3 has capacity to execute many commands and is particularly effective in handling data base files and electronic spreadsheet functions where calculations involve a table of numbers arranged in rows and columns. Accordingly, the computer software utilized in the present invention alternates between LOTUS and FORTRAN to optimize execution time.

Figure 7:
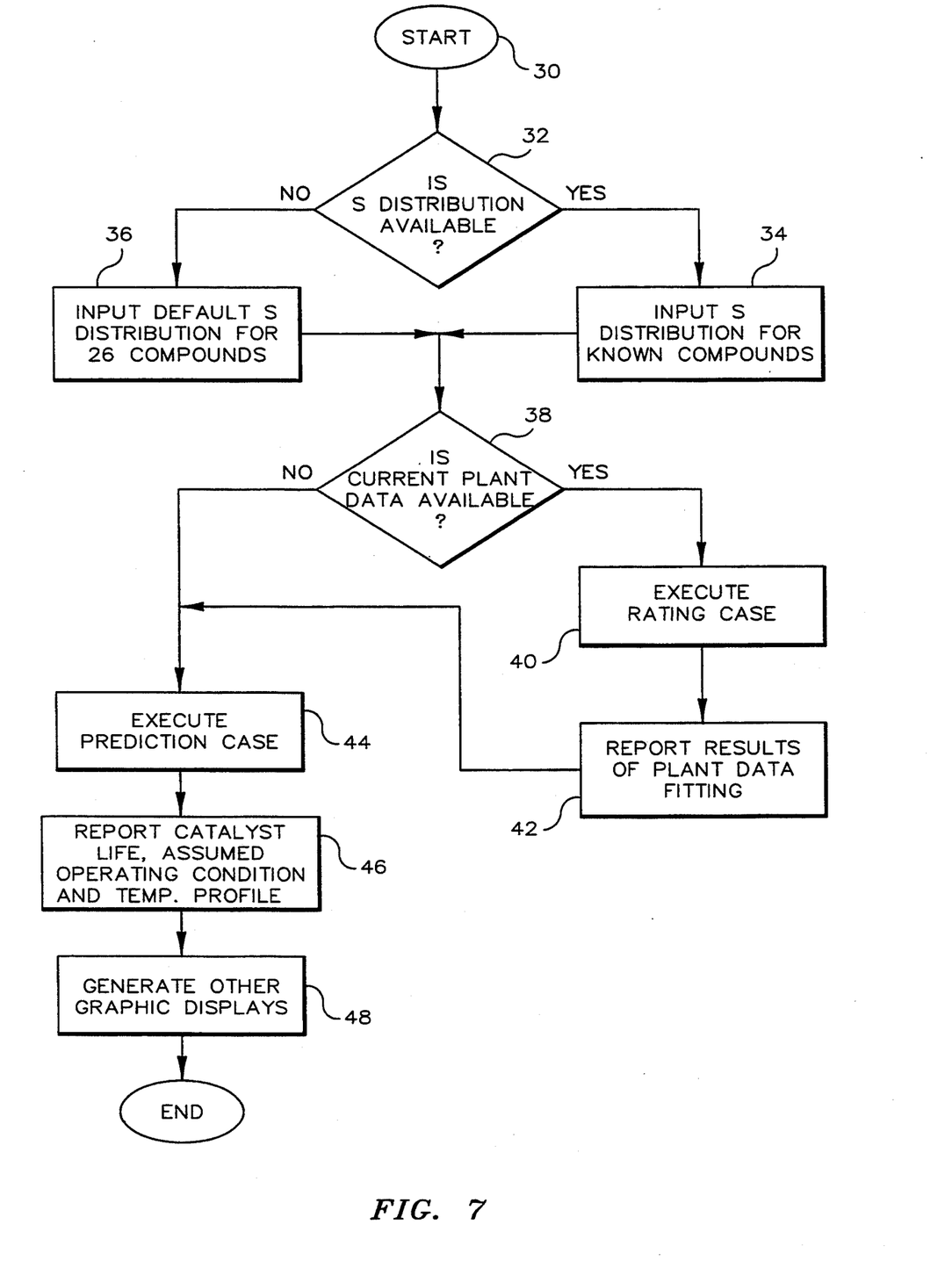
FIG. 7 is a simplified computer program flow diagram which illustrates the overall simulation according to this invention.
Figure 11:
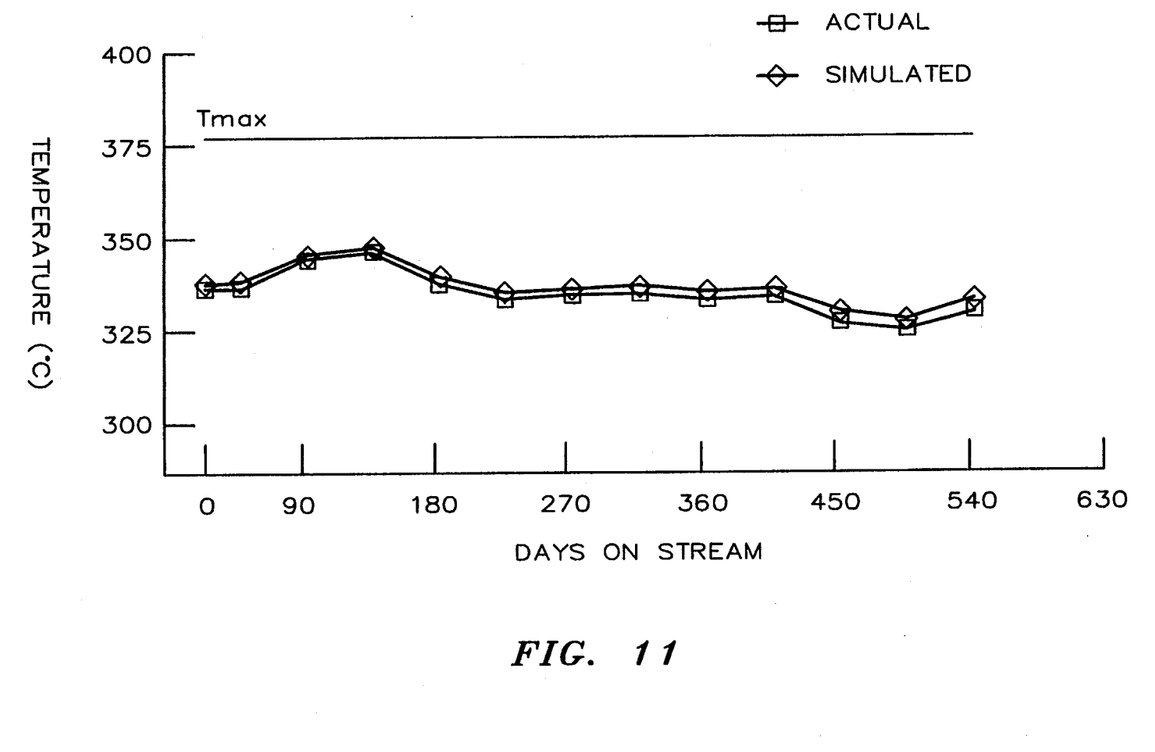
FIG. 11 is a temperature-time profile for a rating case simulation

Referring now to FIG. 7, the simulation program is made operational at a start step 30 in response to an operator-entered command. The simulation routine first determines in a discrimination step 32 if a known sulfur distribution for the feed to be simulated is available. If available, the known distribution of sulfur compounds is entered into the simulation as Indicated in step 34. If a known distribution is unavailable, default values which may include concentrations of twenty-six of the most commonly encountered sulfur contaminants found in distillate fractions is entered as indicated in step 36. The simulation then proceeds to discrimination step 38 where a determination is made as to whether or not current plant operating data is available for use in the simulation. If current data is available, a rating case simulation is executed in step 40 to fit the simulated temperature-time profile to the current data. A graphic report showing a reaction temperature profile which compares recent actual temperatures and corresponding simulated temperatures, as shown in FIG. 11, is generated in step 42.

Figure 12:
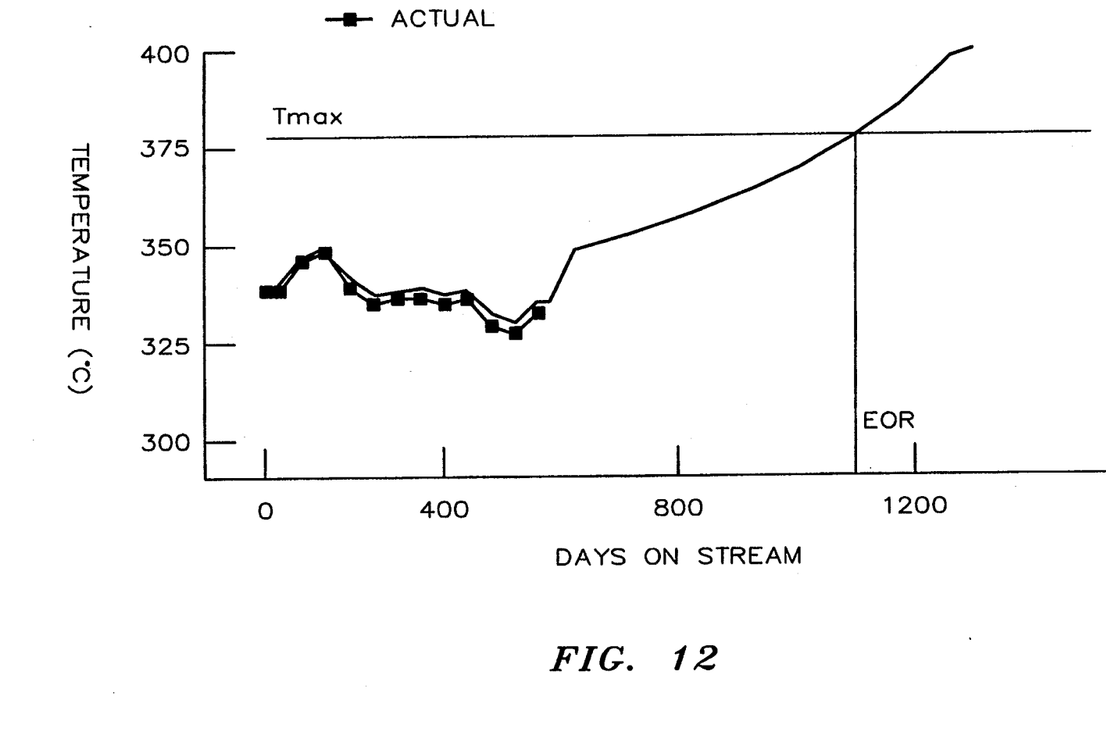
FIG. 12 is a temperature-time profile for a combined rating and prediction case simulation.
Figure 13:
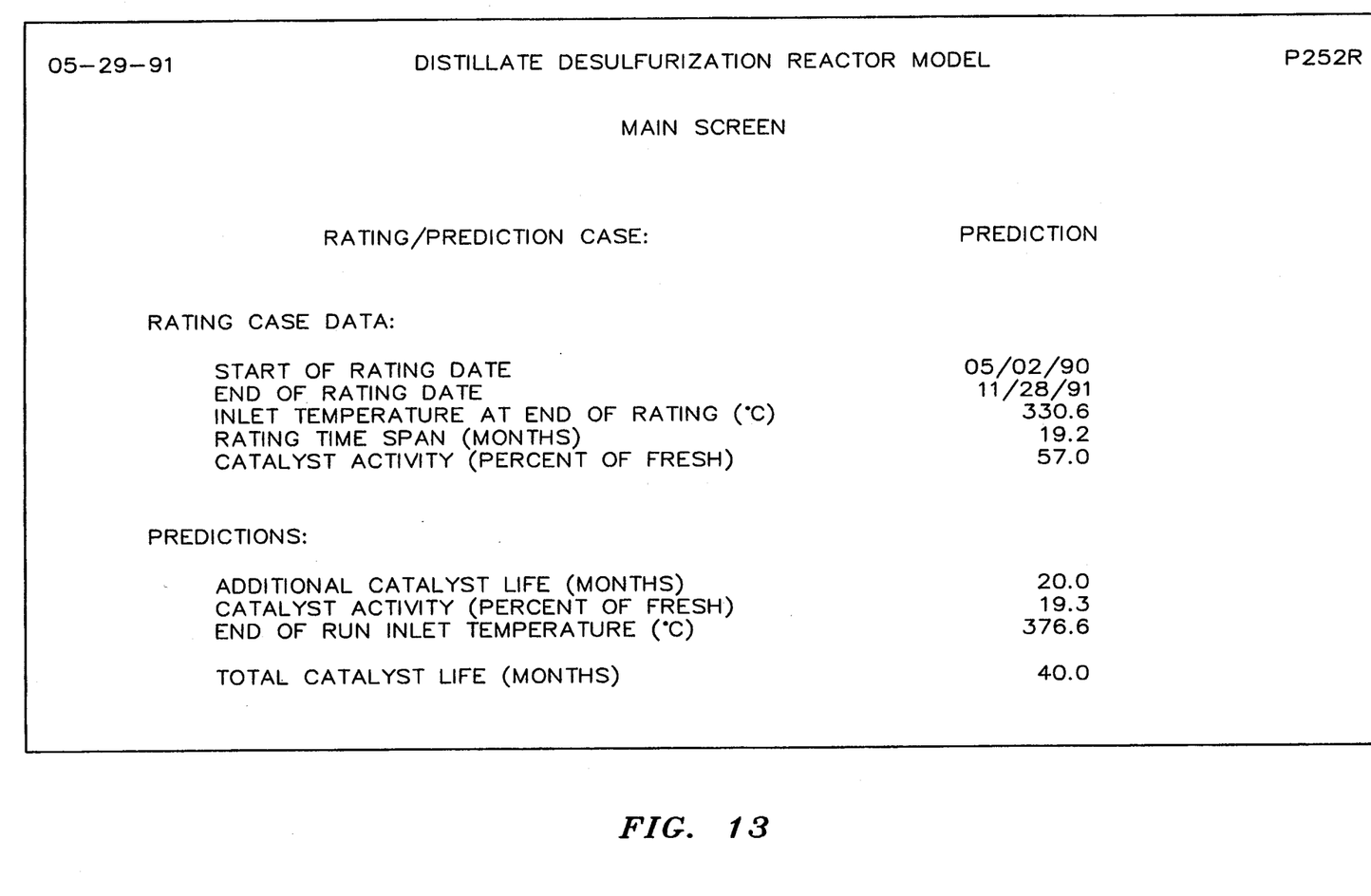
FIG. 13 is a FORTRAN display screen for the simulation showing results of a prediction case.
Figure 14:
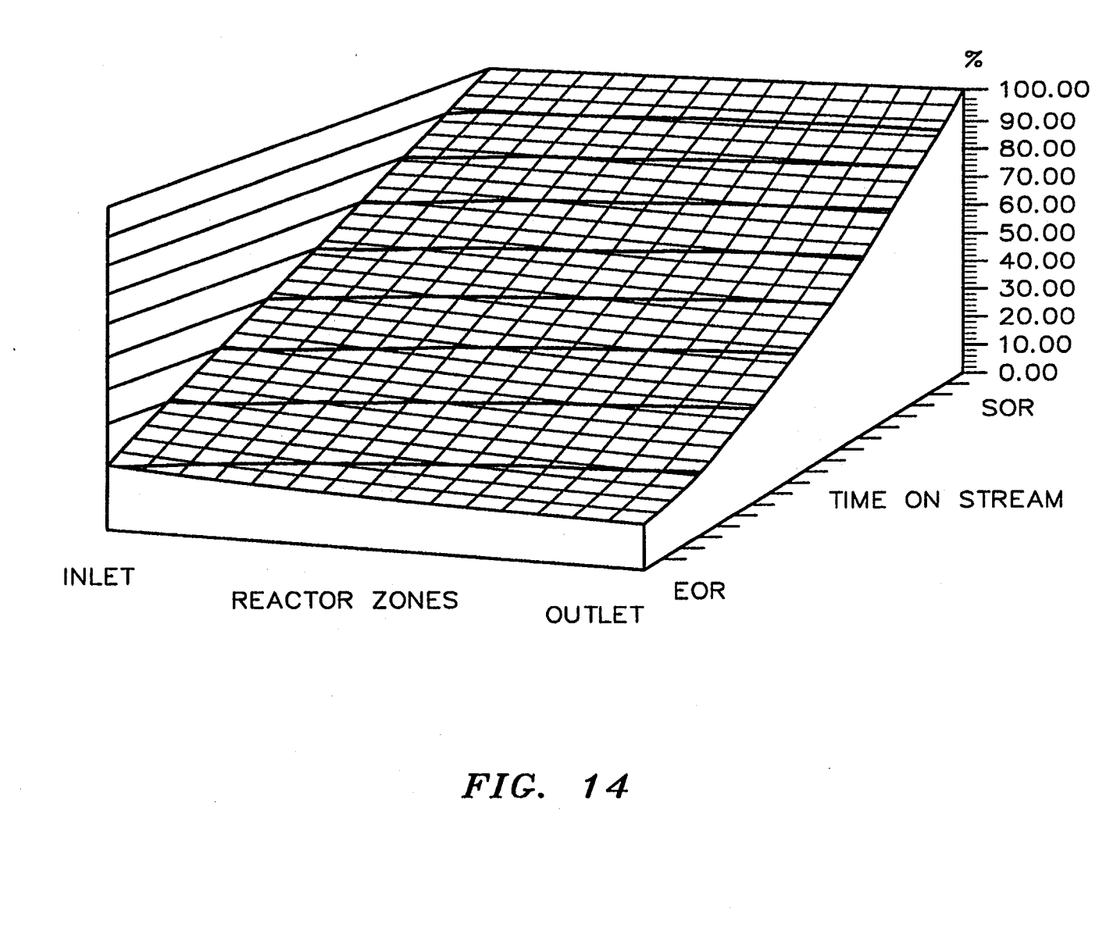
FIG. 14 is a 3-dimensional drawing showing simulated catalyst activity along the reactor.
Figure 15:
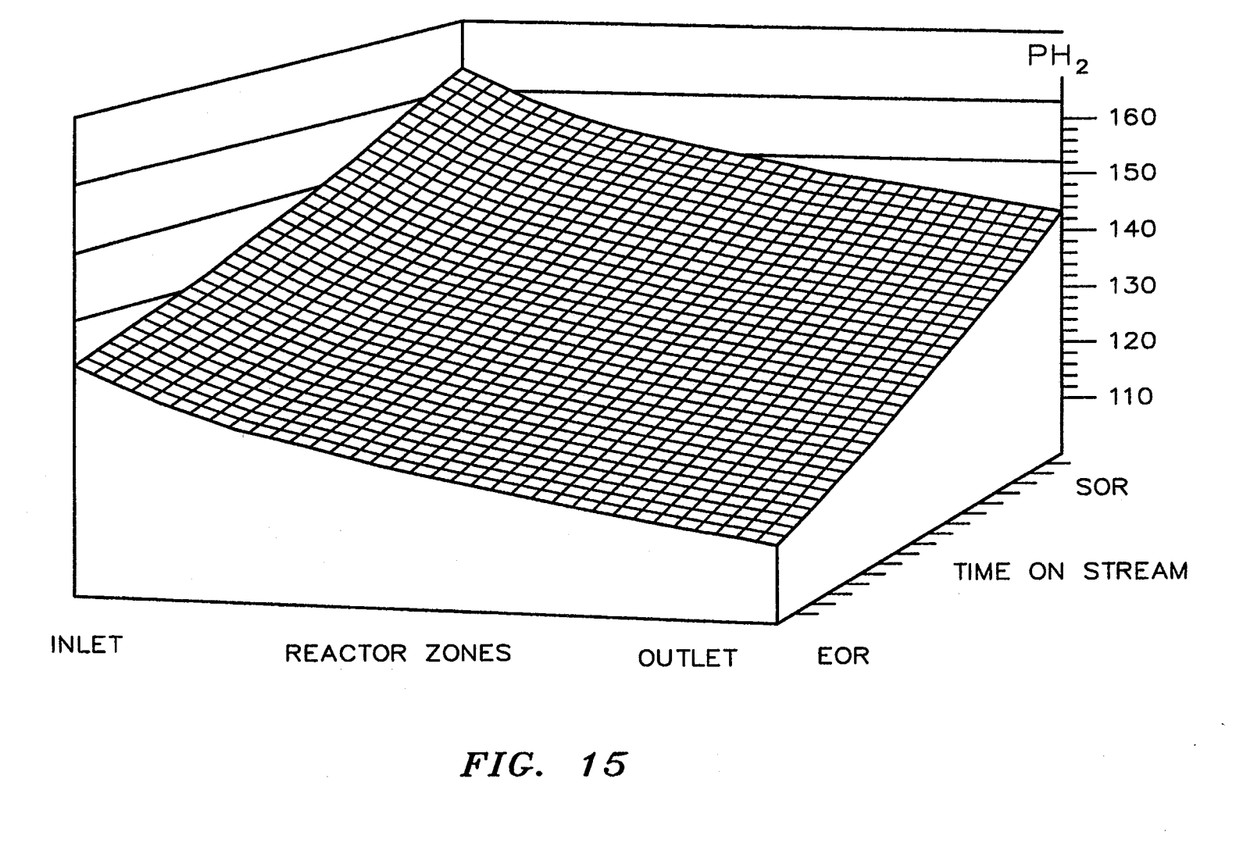
FIG. 15 is a 3-dimensional drawing showing simulated H$_2$ pressure along the reactor.

The simulation program then proceeds to step 44 and executes the prediction case based on projected operational data. The prediction case determines catalyst life based on the simulated reaction temperature reaching a pre-defined maximum temperature. A graphic report showing a temperature-time profile and a calculated life prediction at the end of run (EOR) as shown in FIG. 12, and a prediction case report display as shown in FIG. 13, are generated in step 46. Three dimensional displays showing, for example, percent catalyst activity and hydrogen partial pressure along the reactor, as shown in FIGS. 14 and 15, respectively, are generated in step 48.

Figure 8:
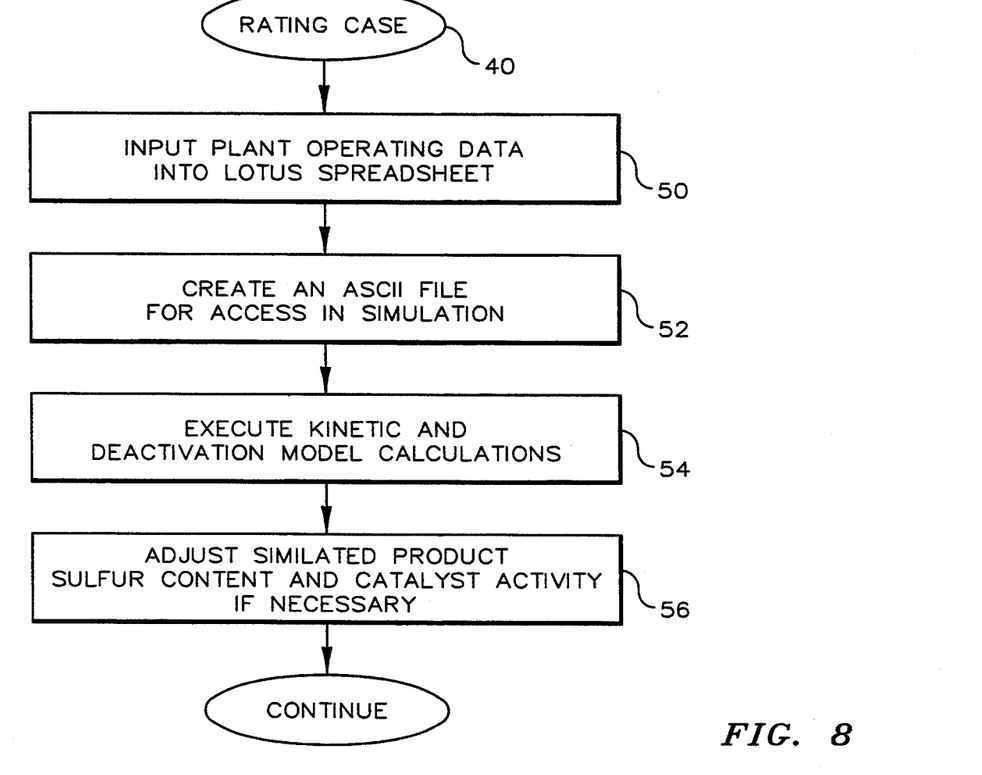
FIG. 8 is a more detailed and flow diagram of a rating case illustration step 40 FIG. 7.

Referring now to FIG. 8, a rating case simulation executed in step 40 of FIG. 7 is illustrated in somewhat greater detail. In step 50, input of data is via a LOTUS 1-2-3 spreadsheet. For example, an input spreadsheet might go from columns A through N and from row 1 through as many rows as required to accomodate the time span to be simulated. This input would include actual plant operating data as well as projected operating data. The contents of the columns A through M for a typical simulation are:

| COLUMN | CONTENT |
| --- | --- |
| A | Date beginning with the Start of Run (SOR) |
| B | Number of days since SOR. |
| C | Sulfur Content in feed. |
| D | Sulfur Content in Product. |
| E | Liquid Hourly Space Velocity |
| F | Reactor Inlet Temperature |
| G | Reactor Pressure |
| H | Reactor Pressure Drop |
| I | Hydrogen Partial Pressure |
| J | Hydrogen Flow |
| K | Hydrogen Purity |
| L | Hydrogen Consumption |
| M | Reactor Delta Temperature |
| N | Reactor Maximum Temperature |

In step 52, an ASCII file, which can be accessed by the simulation, is created by a LOTUS spreadsheet macro instruction, and model calculations are executed in step 54. The simulation then proceeds to step 56 where the simulated sulfur content in the product and the catalyst activity used in the simulation are adjusted to fit the simulated temperature-time profile to the actual profile.

Figure 9:
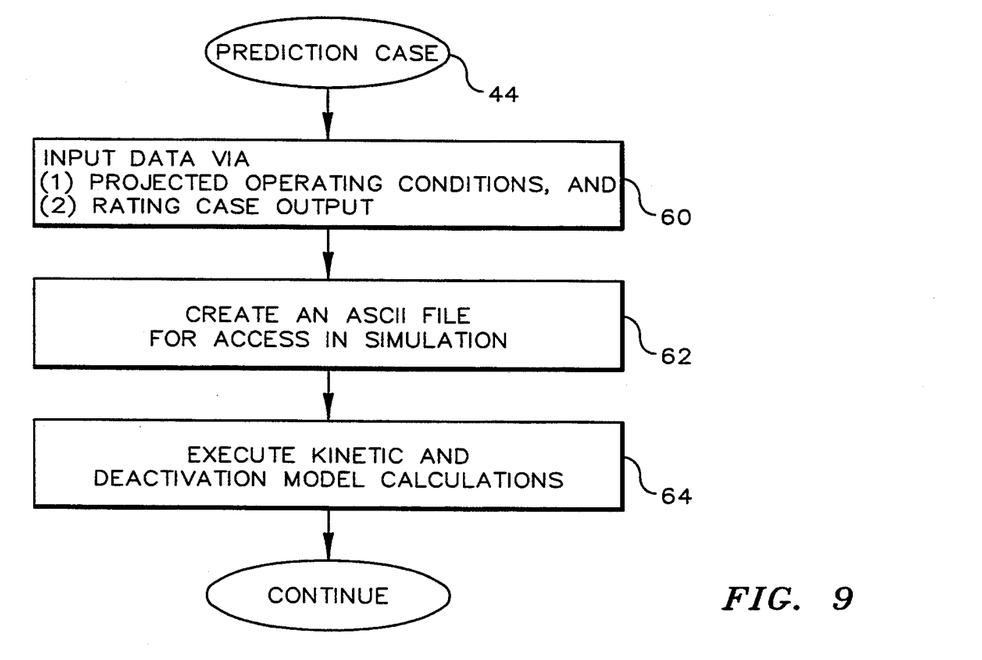
FIG. 9 is a more detailed flow diagram of a prediction case illustrated in step 44 of FIG. 7.

Referring now to FIG. 9, a prediction case simulation executed in step 44 of FIG. 7 is illustrated in somewhat greater detail. In step 60, input data used in the prediction case is received via the output of the rating case, if any, plus input for projected data from a spreadsheet in a manner similar to the input from the spreadsheet illustrated in steps 50 and 52 in FIG. 8. In step 64, model calculations are executed.

Figure 10:
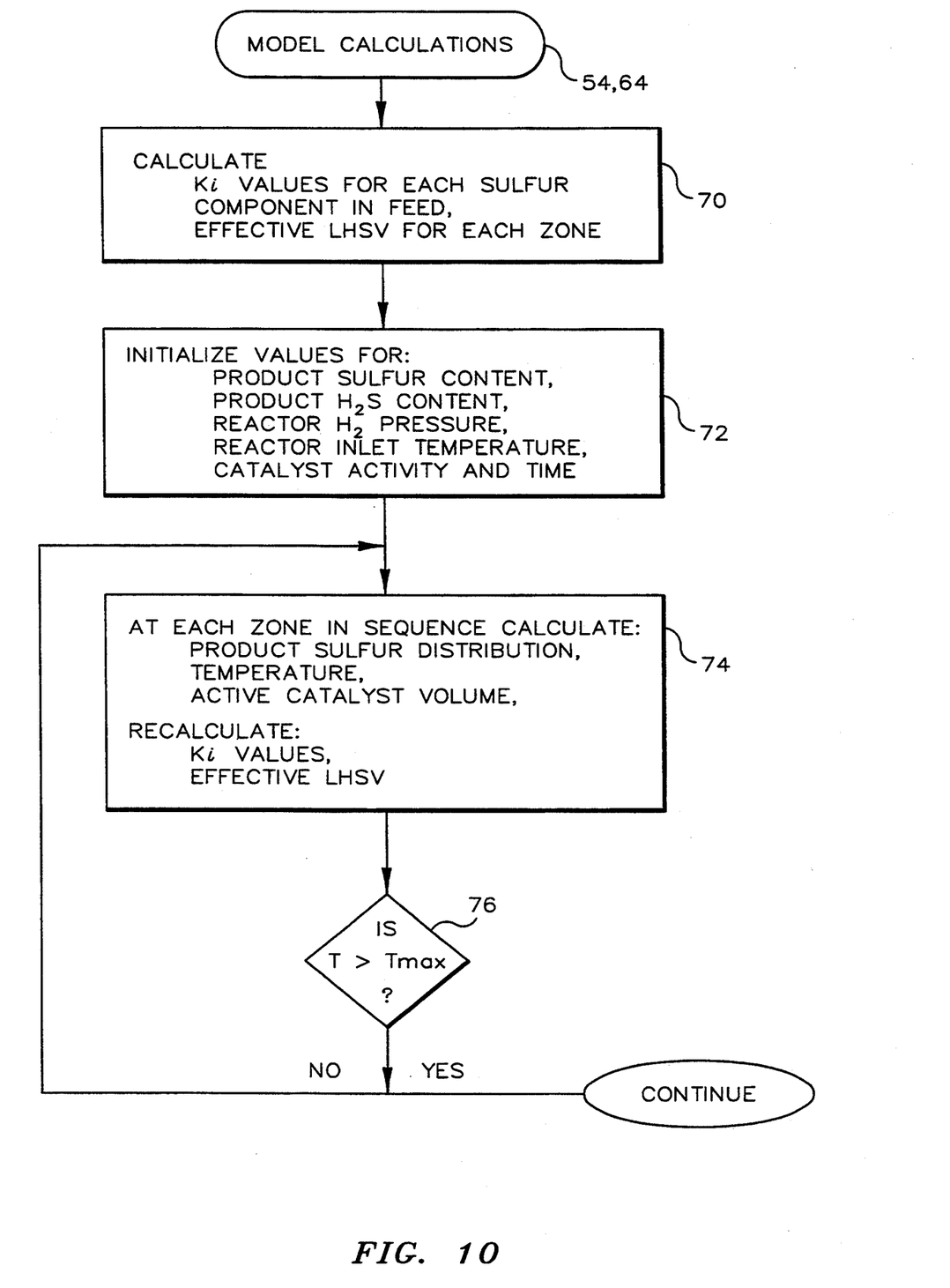
FIG. 10 a flow diagram illustrating the model calculation for the rating and prediction simulations.

Referring now to FIG. 10, the model calculations executed in steps 54 and 64 in FIGS. 8 and 9, respectively, are illustrated in somewhat greater detail. In step 70, $K_i$ values are calculated using equation (2) and the effective LHSV is calculated using the current active catalyst volume, i.e., (Fr/$a_c$). The program then proceeds to initialize data files as illustrated in step 72. Next, the simulation proceeds to step 74 to perform a series of calculations for each of ten model zones. Starting with the zone representing the top of the reactor and moving down the reactor, calculations for an assumed initial inlet temperature include: a product sulfur distribution according to equations (1) activity according to equation (3), and active catalyst volume according to equation (4). Recalculations are then made for $K_i$ values and effective LHSV until convergence for temperature is reached. Next, a determination is made as to whether or not the most recently calculated inlet temperature is greater than $T_{max}$ in step 76. If not, the calculations in step 74 are repeated until the maximum temperature is reached and the time involved is the catalyst life.

As previously stated, the maximum reaction temperature $T_{max}$, which is illustrated in FIGS. 11 and 12, is predefined by the user and is entered with the spreadsheet data to produce an indication on the visual display as illustrted in FIGS. 11 and 12. This maximum reaction temperature can be altered as desired by the user to predict catalyst life for various temperatures.

In accordance with the statede objective to provide data for designing, sizing, and costing new units for deep desulfurization, the data base can be altered and the prediction mode simulation used to forecast the effect of changing various reaction conditions, and accordingly provide reliable design data for constructing new units.

While the invention has been described in terms of the presently preferred embodiment, reasonable variations and modifications such as simulating the removal of various combinations of sulfur species is possible by those skilled in the art and such variations and modifications are within the scope of the described invention and the appended claims.

That which is claimed is:

1. A method of predicting useful life of a catalyst in a continuous hydrodesulfurization (HDS) reaction with the aid of a computer simulation, said method comprising:
   (a) constructing a kinetic model for use in said computer simulation;
   (b) constructing a catalyst deactivation model for use in said computer simulation, wherein said deactivation model specifies a decline of catalyst activity with time and a simulated current reaction temperature required to maintain the initial catalyst activity;
   (c) providing said computer simulation with a data base including at least a maximum HDS reaction temperature, a desired total product sulfur concentration, said initial catalyst activity, and a sulfur component distribution for the feed;
   (d) using said computer simulation for:
      (i) determining a temperature-time profile and the sulfur component distribution of the desulfurized product; and
      (ii) predicting useful catalyst life as the time required for the activity of said catalyst to decline sufficiently that said simulated current reaction temperature reaches said maximum HDS reaction temperature.

2. A method in accordance with claim 1, wherein said data base includes:
   reaction rate constants and activation energies for use with said kinetic model; and
   catalyst age for use with said deactivation model;

3. A method in accordance with claim 1 wherein said data base includes:
   current pressure and temperature operating variables from a commercial HDS reactor, predetermined reaction rate constants and activation energies, and catalyst age.

4. A method in accordance with claim 1 wherein said kinetic model is an analytical model, and said deactivation model is a semi-empirical model.

5. A method in accordance with claim 1 wherein said computer simulation describes the operation of a continuous hydrodesulfurization reaction which processes a hydrocarbon stream containing sulfur components including benzothiophenes and dibenzothiophenes, 6. A method in accordance with claim 5, wherein said kinetic model comprises equations of the form:

$$Cs_{ip} = Cs_{if} \exp(-K_i * a_c / Fr)$$

and said deactivation model comprises an equation of the form:

$$\ln(k_c) = A + B(1000/T) + C(P)$$

where:
   i = index for sulfur compounds
   $Cs_{ip}$ = Concentration of sulfur compound in product $Cs_{if}$ = Concentration of sulfur compound in feed
$K_i$ = 1st order reaction rate of a sulfur compound
$k_c$ = reaction rate constant for catalyst deactivation
$a_c$ = active catalyst volume
$Fr$ = feed rate of oil pumped to reactor
$P$ = reactor hydrogen pressure A,B,C are experimentally determined constants.

7. A method in accordance with claim 1, wherein computer input/output and graphic operations for said simulation are implemented with the aid of a software package for handling input/output operations and numerical calculations are executed in FORTRAN language.

8. A method in accordance with claim 1 wherein said step of constructing a kinetic model additionally comprises:
determining a reaction rate constant for a sulfur compound to be removed in said HDS reaction.

9. A method of providing process design data for a continuous catalytic hydrodesulfurization (HDS) process with the aid of a computer simulation, said method comprising:
(a) constructing a kinetic model for use in said computer simulation;
(b) constructing a catalyst deactivation model for use in said computer simulation, wherein said deactivation model specifies a decline of catalyst activity with time and a simulated current reaction temperature required to maintain the initial catalyst activity;
(c) providing said computer simulation with a data base including at least initial process conditions, a maximum HDS reaction temperature, a desired total product sulfur concentration, said initial catalyst activity, and a sulfur component distribution for the feed;
(d) using said computer simulation for:
(i) determining a temperature-time profile and the sulfur component distribution of the desulfurized product; and
(ii) predicting useful catalyst life as the time required for the activity of said catalyst to decline sufficiently that said simulated current reaction temperature reaches said maximum HDS reaction temperature; and
(e) providing said design data by altering said data base in step (c) and then repeating step (d) so as to determine a plurality of temperature time profiles and corresponding predictions for catalyst life.

10. A method in accordance with claim 9 wherein said data base includes:
pressure and temperature operating variable from a commercial HDS reaction;
a reaction rate constant for dibenzothiophene, and an activation energy for dibenzothiophene.

11. Apparatus for predicting useful life of a catalyst in a hydrodesulfurization (HDS) reaction which comprises:
(a) a computer for simulating said HDS reaction, said computer having a kinetic model for said HDS reaction and a deactivation model for said catalyst stored in memory, and wherein said deactivation model specifies a decline in catalyst activity with time and a current reaction temperature required to maintain the initial catalyst activity;
(b) wherein said computer is programmed for simulating said HDS reaction by:
(i) determining a temperature-time profile and the sulfur component distribution of the desulfurized product; and
(ii) predicting useful catalyst life as the time required for the activity of said catalyst to decline sufficiently that a simulated reaction temperature reaches a maximum allowable HDS reaction temperature in order to maintain said initial catalyst activity; and
(c) input means associated with said computer for receiving and storing data for simulating said HDS reaction, said data including at least a maximum HDS reaction temperature, a desired total product sulfur concentration, said initial catalyst activity, and a sulfur component distribution for the feed.

12. Apparatus in accordance with claim 11, wherein said data base additionally includes:
pressure and temperature operating variable from a commercial HDS reaction;
a reaction rate constant for dibenzothiophene, and an activation energy for dibenzothiophene.

* * * * *